United States Patent [19]

Clark

[11] Patent Number: 5,765,304

[45] Date of Patent: *Jun. 16, 1998

[54] TURF-GROWING PROCESS

[76] Inventor: Edward H. Clark, 7950 El Capitan Dr., La Mesa, Calif. 91941

[*] Notice: The term of this patent shall not extend beyond the expiration date of Pat. No. 5,189,833.

[21] Appl. No.: 574,414

[22] Filed: Dec. 15, 1995

Related U.S. Application Data

[60] Continuation of Ser. No. 140,191, filed as PCT/US93/01804 Feb. 26, 1993 published as WO93/17544 Sep. 16, 1993, abandoned, which is a division of Ser. No. 848,676, Mar. 9, 1992, Pat. No. 5,189,833.

[51] Int. Cl.⁶ ............................................. A01B 79/00
[52] U.S. Cl. .................... 47/58; 47/1.01; 47/9; 47/56; 47/DIG. 10
[58] Field of Search ................... 47/58, 58.25, 58.09, 47/1.01, DIG. 10, 9, 56; 428/15

[56] References Cited

U.S. PATENT DOCUMENTS

| | | | |
|---|---|---|---|
| 4,268,993 | 5/1981 | Cunningham | 47/58 |
| 4,812,339 | 3/1989 | Shibata et al. | 428/15 |
| 5,189,833 | 3/1993 | Clark | 47/56 |
| 5,301,466 | 4/1994 | Egan | 47/58 |

OTHER PUBLICATIONS

Taylor et al. Sub-root zone layering effects on water retention in sports turf soil profiles. Agron. J. 85:625–630, 1993.

*Primary Examiner*—David T. Fox
*Assistant Examiner*—Melissa L. Kimball
*Attorney, Agent, or Firm*—Henri J. A. Charmasson; John D. Buchaca

[57] ABSTRACT

A process for growing a light weight, transportable sod-mat and for facilitating the implantation of such a mat on a lawn bed comprises germinating lawn-grass seeds (5) in a thin layer of growing medium (4) spread over a mat of non-woven polypropylene (3) laying on an impermeable membrane (2). After germination, the mat and the inseminated growing medium is installed over a layer of porous material such as decomposed granite covering a conditioned subsoil. Drip irrigation lines are run through the upper region of the porous material.

7 Claims, 1 Drawing Sheet

TURF-GROWING PROCESS

This application is a continuation of application Ser. No. 08/140,191, filed as PCT/US93/01804, Feb. 26, 1993 published as WO93/17544, Sep. 16, 1993, now abandoned, which is a divisional of application Ser. No. 07/848,676 filed Mar. 9, 1992, now U.S. Pat. No. 5,189,833.

FIELD OF THE INVENTION

This invention relates to the field of agronomy and more specifically to the growing and transplantation of sod-mats.

BACKGROUND OF THE INVENTION

Transplantable sod is typically grown in heavy soil, then harvested with a machine that cuts a mat approximately 2.5 centimeters (1 inch) thick, 45 centimeters (18 inches) wide and 1.2 meters (48 inches) long. These mats are then stacked on pallets up to a weight of about 1 metric ton (2200 lbs.), then shipped for transplantation over a conditioned top soil where one pallet load will cover approximately 42 square meters (50 square yards).

The successful transplantation of such sod ribbons requires heavy watering and large quantities of fertilizer and other soil amendments.

There have been several attempts in the past to produce less cumbersome sod mats of larger size for easier installation, as exemplified by the disclosure of U.S. Pat. No. 4,982,526 Miyachi. However, in the growing and transportation of sod mats of the prior art, the weight reduction has been traded for a more complex and more labor and time-consuming process.

SUMMARY OF THE INVENTION

The principal and secondary objects of this invention are to provide a simple and rapid process for growing light sod mats which can be cut in long rollable ribbons for easy transportation, then installed in a minimum of time; and to provide a lawn bed for the implantation of such sod mats that favorize rapid growing of a durable turf while requiring minimal irrigation.

These and other valuable objectives are achieved by germinating lawn grass seeds in a thin layer of growing medium sprayed over a mat of non-woven polypropylene lying atop an impermeable membrane. After a few days of germination the mat carrying the inseminated growing medium can be lifted, rolled then spread over a lawn bed where the conditioned top soil lies below an upper porous layer of sand or decomposed granite. Drip irrigation lines are run through the upper region of the sand or decomposed granite layer. Strong growing of roots through the porous layer down to the underlying top soil is favored by the thermal insulation, moisture retention and minerals admixture provided by the sand or decomposed granite.

Other advantages to the installation of the drip irrigation lines near the top surface of the lawn bed in the granular medium of the porous layer, rather than more deeply into the soil as taught by the prior art, include ease of installation over uneven and steeply sloping areas, quick access for repair or rerouting of water lines, and avoidance of the drip hole clogging that occurs when the irrigation lines lie in the water saturated substance.

DESCRIPTION OF THE PREFERRED EMBODIMENT OF THE INVENTION

Figure 1:
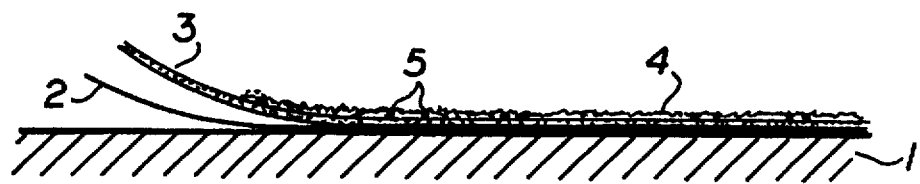
FIG. 1 is a cross-sectional view of the sod mat germination process.

A flat surface 1 outdoors or in an enclosure favorable to vegetation, such as a hot house, is first covered by an impermeable membrane 2. The membrane is preferably a thin black film of polyvinyl.

A porous mat 3 is then placed over the membrane 2. The mat is preferably a slightly porous sheet of non-woven spun bonded polypropylene of the type typically used as a weed barrier in the preparation of lawn beds, as the standard grade T-3201 commercially available under the brand name TYPAR from REEMAY, INC. of Old Hickory, Tenn. Such a polypropylene matting material is characterized by a relative low weight of approximately 60 grams per square meter (1.9 oz. per square yard), a coefficient of permeability of 0.04 centimeter per second and no more than 0.07 centimeter per second measured under ASTM D-4491 protocol, and an A.O.S. equivalent sieve of at least 0.5 millimeter measured under ASTM D-4751 protocol. A growing medium 4 is then spread over the polypropylene mat 3 to a thickness between 3 millimeters (⅛ inch) to 6 millimeters (¼ inch). The growing medium is preferably made of an equal volume of peat moss and paper mulch. Lawn seeds 5 are then disbursed through the growing medium 4. The growing medium is watered and kept moist through germination of the seeds. After germination, roots and stolons grow into the polypropylene substrate 3 toward the moisture retained by the membrane 2. After seven to ten days the vegetation is sufficiently implanted into the polypropylene backing 3. The mat consisting of the implanted polypropylene backing 3 and growing medium 4 can be lifted from the membrane 2, rolled and transported for installation on a lawn bed.

It should be noted that the paper mulch, once watered, acts as an agglutinate which greatly contributes to the bonding of the growing medium 4 to the polypropylene substrate 3. The black membrane 2, not only retains the moisture, but further favors germination by absorbing heat and reflecting it toward the germinating seeds. The harvested mat can be made or cut to a width of 0.9 meters (3 feet), 1.8 meters (6 feet) or 4.5 meters (15 feet), and to lengths of up to 90 meters (300 feet).

Most significantly, the sod mat 6 of the invention is extremely light. It takes only approximately 40 kilos (87 lbs.) of such a sod mat to cover the same area as 1 metric ton (2200 lbs.) of the prior art sod mat. The weight is thus reduced by a factor of 25.

Figure 2:
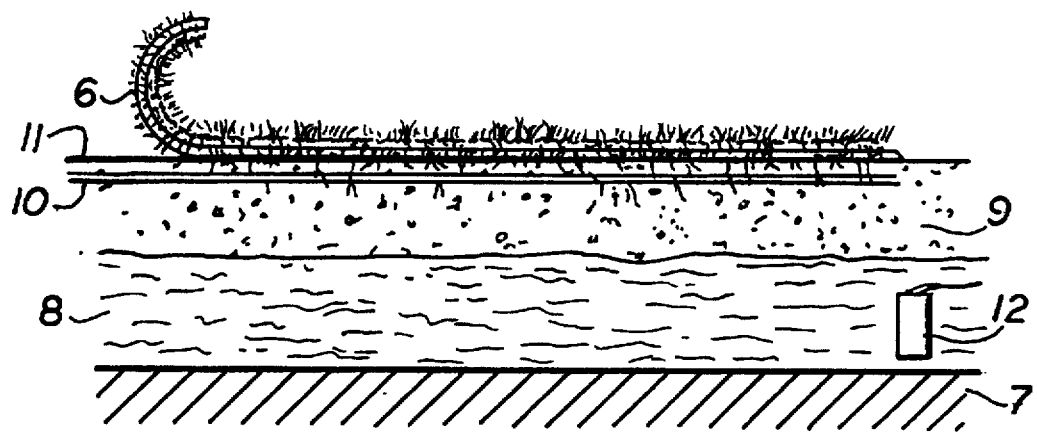
FIG. 2 is a cross-sectional view of the sod mat installed over a lawn bed prepared according to the invention.

As shown in FIG. 2, the sod mat 6 according to the invention can be laid on a lawn bed which is prepared in a manner opposite to the conventional method of placing top soil on the surface and the drainage material underneath. It was found more advantageous to prepare a lawn bed on any type of underground structure 7 by building a layer of top soil or amended soil 8 to a thickness between 15 centimeters (6 inches) to 18 centimeters (8 inches). This soil layer 8 may include water retaining mulch and appropriate fertilizing substances. The top soil layer 8 is then covered by a porous mineral layer 9 made of sand or, preferably, decomposed granite to a thickness between 5 centimeters (2 inches) to 10 centimeters (4 inches). Drip irrigation lines 10 are buried in the upper region of the porous material layer 9 approximately 2.5 centimeters (1 inch) from the top surface 11 of the lawn bed upon which the sod mat 6 is deployed; in direct departure from the conventional practice of placing the irrigation lines up to 30 centimeters (12 inches), into the subsoil.

The combination of the roots and stolons of the germinated seeds and the porous polypropylene fabric 3 into which they grow gives the sod mat 6 additional strength to stand up to heavy traffic. Due to the reversed layering of the lawn bed, the drip irrigation lines located close to the surface allow the water to trickle down through the porous layer 9 into the top soil layer 8.

It is believed that the electrolysis resulting from the conjunction of the water and the minerals in the sand or decomposed granite create an electromagnetic drawing action of the positive and negative ions in the water, resulting in an even dispersement of the water. The porous layer 9 provides necessary drainage from the surface to the subsurface top soil; serves as a cistern system for the grass roots; provides moisture and nutrients to the subsurface top soil; minimizes the loss of water that is normally due to capillary action and evaporation; allows for strong root penetration into the amended top soil 8; and serves as a thermal insulator for the subsoil. While the resulting lawn requires much less water than convention lawns, it is recommended that the moisture sensors 12 be buried in the lower top soil layer 8 for a more accurate monitoring of moisture levels.

I claim:

1. A process for conditioning a turf-growing area which comprises:

building a layer of amended soil having a first granularity, said amended soil being conditioned to provide nutrients to said area;

piling a thermally insulating stratum of porous minerals directly atop said layer of amended soil, whereby said stratum and said layer of amended soil are in direct physical contact with one another;

said stratum being selected to drain water into said layer of amended soil;

said stratum having a granularity coarser than said first granularity;

thereby allowing said stratum to provide thermal insulation to said layer of amended soil and water retention in said layer of amended soil; and placing a compound comprising germinating seeds directly over said insulating stratum.

2. The process of claim 1, wherein the step of building a layer of amended soil comprises stacking conditioned top soil to a height of at least 15 centimeters.

3. The process of claim 1 which further comprises installing drip irrigation lines in an upper region of said stratum of porous material.

4. The process of claim 1, wherein the step of piling a stratum of porous material comprises accumulating a layer of sand at least 5 centimeters high.

5. The process of claim 1, wherein the step of piling a stratum of porous material comprises accumulating a layer of decomposed granite at least 5 centimeters high.

6. A process for conditioning a turf-growing area which comprises:

building a layer of amended soil having a first granularity; and piling a stratum of porous minerals having a granularity coarser than said first granularity directly atop said layer of amended soil, whereby said stratum and said layer of amended soil are in direct physical contact with one another;

said stratum providing thermal insulation to said layer of amended soil and water retention in said layer of amended soil.

7. The process of claim 6, which further comprises:

placing a compound comprising germinating seeds directly over said stratum, and allowing roots from a number of said germinating seeds to penetrate into said layer of amended top soil.

* * * * *